April 16, 1957 A. T. GORMAN 2,789,016
FLUID PRESSURE BRAKE APPARATUS
Filed Feb. 18, 1954
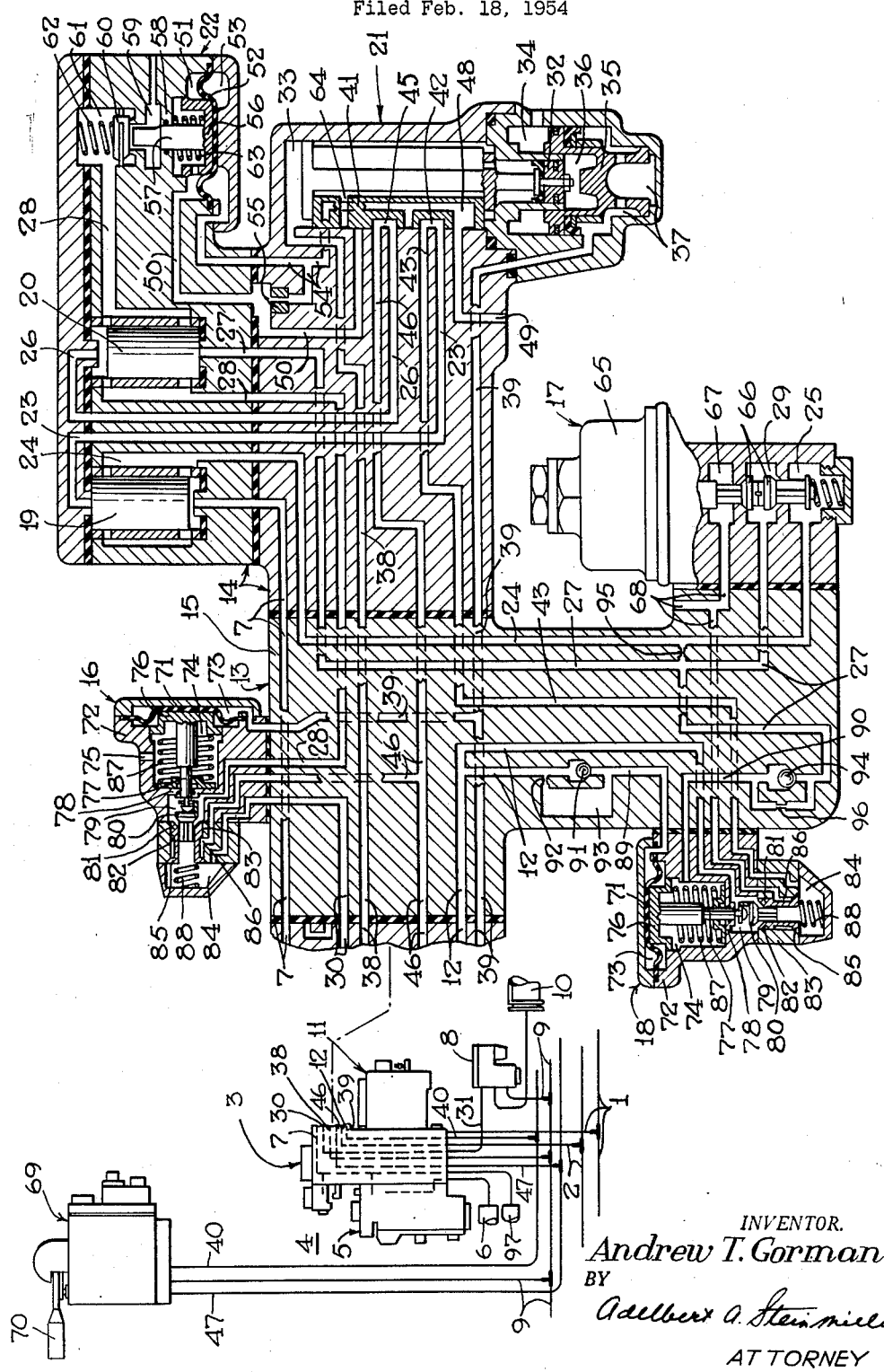
INVENTOR.
Andrew T. Gorman
BY
Adelbert A. Steinmiller
ATTORNEY …

United States Patent Office 2,789,016
Patented Apr. 16, 1957

2,789,016

FLUID PRESSURE BRAKE APPARATUS

Andrew T. Gorman, Pitcairn, Pa., assignor to Westinghouse Air Brake Company, Wilmerding, Pa., a corporation of Pennsylvania Application February 18, 1954, Serial No. 411,058

12 Claims. (Cl. 303—3)

This invention relates to fluid pressure brake apparatus and more particularly to the type adapted for use on railway locomotives.

In Westinghouse Air Brake Company's Instruction Pamphlet No. 5066 dated March 1948, there is shown and described a No. 24–RL locomotive brake equipment adapted to control the brakes on a locomotive and connected cars of a train on either the usual automatic principle through the medium of a brake pipe or on the electro-pneumatic principle through the medium of train wires and a straight air pipe. This equipment comprises an engineer's automatic brake valve device provided on the locomotive for normally controlling the fluid pressure brakes on the locomotive and cars in unison; and further comprises an engineer's independent brake valve device, also provided on the locomotive, for controlling the locomotive brakes independently of those on said cars.

With this equipment, if the engineer desires to reduce the degree of an automatic brake application on the locomotive independently of that on the connected cars, he moves the handle of the independent brake valve device from a normal or release position into a so-called application zone to an extent corresponding to the degree of brake application he desires to retain on the locomotive and, at the same time, he depresses said handle for reducing locomotive brake cylinder pressure. Since the rate of such reduction is very rapid, however, it is extremely difficult to control the extent thereof, and consequently the locomotive brake cylinder pressure will generally be reduced considerably below the value corresponding to the desired degree of brake application to be retained. Thus, when the engineer relaxes manual force on the handle and it returns to an elevated position in the application zone, the locomotive brakes will rapidly reapply to a degree corresponding to the preselected position of said handle in said zone. With this arrangement, the locomotive will tend to initially run out from the cars and then, as the locomotive brakes are reapplied, the cars may run into the locomotive, which is obviously undesirable because of the possibility of damage to the locomotive and cars and the strain on the intervening couplings. The severity of this undesirable condition will, of course, depend upon the extent of initial reduction in locomotive brake cylinder pressure below that called for by the preselected position of the independent brake valve handle in the application zone.

Moreover, with equipment of the type just described, it is not possible to effect a partial release of an electro-pneumatic brake application on the locomotive, and so in order to obtain a reduced degree of braking on the locomotive during an electro-pneumatic brake application throughout the train, the engineer must use the dynamic brakes; the electro-pneumatic brakes on the locomotive being completely released under this condition by operation of an interlock magnet valve device.

The principal object of this invention is to provide certain improvements in fluid pressure brake apparatus of the above type.

According to this object, novel means are provided for automatically limiting an independent release of an automatic brake application to an extent corresponding to preselected position of the independent brake valve handle in the application zone, and thereby eliminating the undesirable condition above described.

Novel means are also provided for desirably permitting an electro-pneumatic brake application to be partially released on the locomotive to an extent corresponding to preselected positions of the independent brake valve handle in the application zone, and for also completely releasing and holding off an electro-pneumatic brake application on the locomotive without requiring the use of an independent brake valve device having the special so-called "lockdown" feature presently required to attain this result.

Novel means are also provided for eliminating the possibility during an electro-pneumatic brake application throughout the train, of an undesirable, unintentional lockout of the fluid pressure brakes on the locomotive in the event train speed increases, such as while descending a grade.

Other objects and advantages will become apparent from the following more detailed description of the invention and from the accompanying drawing, in which the single figure is a diagrammatic view of a portion of a No. 24–RL locomotive brake apparatus embodying the invention and especially adapted for use with locomotives adapted for dynamic braking.

Description

Since the fluid pressure brake apparatus embodying the invention may, for sake of illustration, be basically like that shown in the aforementioned instruction pamphlet, the disclosure in the accompanying drawing and in the following description has been limited to only such structure and operational characteristics as are deemed essential to a clear understanding of the invention.

Moreover, the brake apparatus shown in the drawing is particularly adapted for use on locomotives of the diesel or diesel-electric type on which the driving motors are adapted to act as generators to provide dynamic braking; and said apparatus is further adapted to control the fluid pressure brakes on both the locomotive and connected cars of a train on the automatic principle through the medium of a brake pipe 1 or, alternatively, on the electro-pneumatic principle through the medium of a straight air pipe 2, both of which pipes are adapted to extend through the train.

An engineer's automatic brake valve device (not shown), provided on the locomotive, is adapted to vary, selectively, the pressures of fluid in the brake pipe 1 and in a straight air control pipe (not shown); the pressure in the latter pipe controlling the pressure in the straight air pipe 2, in the usual manner.

The brake pipe 1 and straight air pipe 2 are connected to the usual pipe bracket portion 3 of a brake controlling valve device 4 provided on the locomotive. The device 4 also comprises the usual service portion 5 adapted to respond to a service reduction in pressure in the brake pipe 1 to supply fluid under pressure from an auxiliary reservoir 6 to a passage 7 and thence, by way of a communication to be described subsequently, to a brake cylinder relay valve device 8 for actuating same to supply fluid at a corresponding pressure from a fluid pressure supply pipe 9 to a brake cylinder device 10 for effecting an automatic service application of the locomotive brakes.

The service portion 5 comprises means (not shown) including a movable abutment subject to opposing fluid pressures in one chamber open to the brake pipe 1 and another chamber open to the auxiliary reservoir 6 for controlling movement of a slide valve to a supply, lap or release position according to whether fluid pressure in said brake pipe is less than, equal to or greater than that in said reservoir. Hence, after initial charging of passage 7, the slide valve will be carried to lap position for cutting off further supply to said passage; and if fluid under pressure is thereafter released from said passage, it will remain vented until pressure in the brake pipe is changed and causes operation of said slide valve, for reasons which will be understood from subsequent description of operation.

The brake controlling valve device 4 also comprises the usual emergency portion 11, adapted to cooperate with the service portion 5 upon an emergency reduction in pressure in the brake pipe 1 to supply fluid under pressure to the brake cylinder relay valve device 8 for thereby actuating the brake cylinder device 10 to effect an emergency application of the locomotive brakes.

Upon recharging of the brake pipe 1 and the auxiliary reservoir 6 with fluid under pressure, following either a service or an emergency application of the brakes, the service portion 5 of device 4 is adapted to assume a release portion for venting passage 7 and thus causing the relay valve device 8 to vent fluid under pressure from the brake cylinder device 10 for releasing the locomotive brakes.

On the other hand, upon supply of fluid under pressure to the straight air pipe 2, such fluid will flow to a passage 12 in bracket portion 3 and thence, via a communication hereafter to be described, to the brake cylinder relay valve device 8 for actuating same to supply fluid under pressure to the brake cylinder device 10 to apply the locomotive brakes; whereas, upon release of fluid under pressure from said straight air pipe, fluid under pressure will be released from said relay valve device and hence from said brake cylinder device for releasing said brakes.

According to the invention, an improved interlock portion 13 is interposed between the pipe bracket portion 3 and the usual independent application and release portion 14 of the brake controlling valve device 4.

The interlock portion 13 comprises a filling piece 15, on an upper surface of which is mounted an independent brake release interlock valve device 16. On a depending part of filling piece 15 is mounted the usual dynamic brake interlock magnet valve device 17 for preventing or releasing an automatic or electro-pneumatic application of the locomotive brakes whenever the dynamic brakes are cut in on the locomotive; and on said depending part is also mounted an electro-pneumatic brake interlock valve device 18 for desirably preventing leakage of straight air pipe pressure to atmosphere when the dynamic brakes on the locomtive are cut in concurrently with an electro-pneumatic brake application on the connected cars of the train, as well as for other reasons hereinafter to be described. The valve devices 16, 17 and 18 will be described subsequently.

The independent application and release portion 14 comprises two double check valves 19, 20, a selector valve device 21 and a quick release valve device 22.

Passage 7 extends through brake controlling valve portion 3, filling piece 15 and portion 14 to the lower end of double check valve 19; and open to the upper end of said check valve is a passage 23 in portion 14. Upon the supply of fluid under pressure alternatively to passage 7 or to passage 23, the double check valve 19 is adapted to shift upwardly or downwardly, respectively, for sealing off the non-charged one of said passages and opening the other charged passage to a side outlet passage 24 extending through portion 14 and filling piece 15 to a chamber 25 of magnet valve device 17.

The double check valve 20 controls, in similar manner, selective fluid pressure communication of a passage 26 open to the upper end of said valve or a passage 27 open to the lower end of said valve with a side outlet passage 28, according to which one of the passages 26, 27 is charged with fluid at the preponderant pressure. Passage 27 extends through portion 14 and filling piece 15 to a chamber 29 of magnet valve device 17; and passage 28 extends through said portion and filling piece and, as will be described subsequently, is adapted to be opened or closed, according to operation of interlock valve device 16, to a passage 30, which extends through filling piece 15 and portion 3 and is constantly open to a control pipe 31 connected to the brake cylinder relay valve device 8.

The selector valve device 21 may comprise, briefly, a piston 32 subject on one side to pressure of fluid in a chamber 33 and on the opposite side to atmospheric pressure in a chamber 34. A piston 35, coaxially arranged with and of larger diameter than the piston 32, is subject on one side to atmospheric pressure in a chamber 36 and on the opposite side to pressure of fluid in a chamber 37; the chambers 33, 37 being so disposed that fluid pressure in chamber 33 acting on piston 32 opposes the effect of fluid pressure in chamber 37 acting on piston 35. Chamber 33 is constantly charged with fluid under pressure from the usual main reservoir (not shown) by way of a branch of the supply pipe 9 and a passage 38 extending therefrom through portion 3, filling piece 15 and portion 14; whereas chamber 37 is chargeable with fluid under pressure or ventable to atmosphere by way of a passage 39 extending through portion 14, filling piece 15 and portion 3 to an independent brake release actuating pipe 40. Disposed in chamber 33 and positively connected to piston 32 is a slide valve 41 which is adapted to assume a normal position, in which it is shown in the drawing, when chamber 37 is vented to atmosphere. With the slide valve 41 in this position, a cavity 42 therein connects the passage 23 to a passage 43 which extends through portion 14 and filling piece 15; and a slide valve cavity 45 connects the passage 26 to a passage 46 which extends through portion 14, filling piece 15 and portion 3 to an independent application and release pipe 47. However, upon supply of fluid under pressure to chamber 37 of device 21, the piston 35 is adapted to advance the piston 32 and hence the slide valve 41 to an upper position, in which a slide valve cavity 48 will vent passages 23 and 26 to atmosphere by way of an exhaust passage 49 in portion 14; while cavity 42 will dead-end the passage 43, and cavity 45 will connect passage 46 to a passage 50 which is open to a pressure chamber 51 in the quick release valve device 22.

The quick release valve device 22 comprises a movable abutment, preferably in the form of a flexible diaphragm 52, subject on one side to pressure of fluid in chamber 51 and on the opposite side to pressure in a control chamber 53. Chamber 53 is open to a passage 54 leading to the slide valve 41, which in normal position vents said passage and hence said chamber to atmosphere by way of cavity 48 and passage 49. A branch of passage 54 is open through a choke 55 to the passage 50. The diaphragm 52 is operatively connected through the medium of a diaphragm follower 56 to an actuating stem 57, which projects through chamber 51 and a partition 58 into an exhaust chamber 59 constantly open to atmosphere; said stem having slidable, sealing engagement with the wall of a bore through said partition. A quick release valve 60, preferably disc-shaped, is provided for controlling communication between a chamber 61 and exhaust chamber 59. Chamber 61 is open to a branch of passage 28 and contains a spring 62 for urging the release valve 60 to a seated position, which position will be assumed when chamber 53 is devoid of fluid under pressure and the diaphragm 52 and stem 57 assume a normal position under action of a spring 63 suitably arranged in chamber 51. However, upon supply of fluid under pressure from chamber 33 of selector valve device 21 to passage 54 by way of a slide valve aperture 64 with the slide valve 41 in upper position, the diaphragm 52 of quick release valve device 22 will deflect against resistance of spring 63 and cause the stem 57 to unseat the release valve 60 against resistance of spring 62, and thus locally vent passages 28, 27 and 26 to atmosphere.

The dynamic brake interlock magnet valve device 17 comprises an electro-magnet 65 which is adapted to be energized when the dynamic brakes are manually cut into operation for thereby releasing or preventing an application of the fluid pressure brakes on the locomotive under such condition, in the usual manner. Energization of the magnet 65 is adapted to cause two abuttingly connected, oppositely seating, tapered valves 66, contained in chamber 29, to assume a lower position in which said chamber is open to atmosphere by way of an exhaust chamber 67 and an exhaust passage 68 in filling piece 15. Upon cut-out of the dynamic brakes on the locomotive and consequent deenergization of the magnet 65, a spring suitably arranged in chamber 25 and acting on a collar encircling a fluted valve stem is adapted to urge the valves 66 to an upper position, in which they are shown in the drawing, for closing off chamber 29 from chamber 67 and opening chamber 29 to chamber 25. The device 17 also comprises the usual means for automatically cutting out the dynamic brakes and deenergizing the magnet 65 in response to an emergency reduction in pressure in the brake pipe 1, so as to permit an emergency application of the automatic brakes at all times.

For controlling the pressures of fluid in the actuating pipe 40 and in the independent application and release pipe 47, an engineer's independent brake valve device 69 is provided, preferably of the type designated in the aforementioned instruction pamphlet as the "S–40–F Independent Brake Valve," which has no "lockdown" feature. This brake valve device comprises, briefly, self-lapping valve means (not shown) operable by movement of a handle 70 to a normal or lease position to open both the pipes 40 and 47 to atmosphere for thereby causing the fluid pressure brakes on the locomotive to be controlled in unison with those on the connected cars of the train. The handle 70 is movable horizontally into an application and release zone for maintaining the actuating pipe 40 vented while providing fluid from supply pipe 9 to the independent application and release pipe 47 at a pressure proportional to the extent of such movement so as to effect a corresponding degree of independent application of the locomotive brakes while the brakes on the cars are applied to any lesser degree or are released; and by moving said handle back toward or to normal position, the independent application of the locomotive brakes may be correspondingly released or released to said lesser degree then effective on the cars. The handle 70 is also adapted to be depressed in normal position or in the application zone for causing fluid at main reservoir pressure to flow from supply pipe 9 to the actuating pipe 40 for thereby causing an independent release of an automatic or an electro-pneumatic brake application on the locomotive, in the manner to be described subsequently.

According to a feature of the invention, the independent brake release interlock valve device 16 permits an automatic or an electro-pneumatic brake application to be independently released on the locomotive to any desired degree corresponding to a preselected position of the independent brake valve handle 70 in the application zone or in normal position.

The device 16 may, for sake of illustration, comprise a movable abutment, preferably in the form of a flexible diaphragm 71 clamped between portions of a sectionalized casing 72 and separating a control chamber 73 from a chamber 74. The chamber 73 is chargeable with fluid under pressure or ventable to atmosphere by way of a branch or passage 39, whereas chamber 74 is open to atmosphere by way of a casing port 75. The diaphragm 71 is operatively connected through the medium of a diaphragm follower 76 to a coaxially arranged actuating stem 77 which extends through chamber 74 and has sealing, slidably guided engagement with the wall of an aligned bore through a casing partition 78 and projects into a chamber 79 which, in turn, is constantly open to the passage 28. Suitably attached to the projecting end of stem 77 is a poppet valve 80 seatable against one end of a plunger 81 slidably mounted in a bore 82 extending through a casing partition 83 separating chamber 79 from a chamber 84 constantly open to the passage 30. A valve 85, formed integrally with the opposite end of plunger 81 and seatable against the partition 83, controls communication between chamber 84 and a chamber 86 which is constantly open to a branch of passage 46.

When chamber 73 is devoid of fluid under pressure, the device 16 is adapted to assume a normal position, in which it is shown in the drawing, by virtue of the action of a spring 87 contained in chamber 74 and acting through the medium of the diaphragm follower 76 on the diaphragm 71 and stem 77. With device 16 in normal position, valve 80 is held unseated by stem 77, while valve 85 is held seated by action of a spring 88 in chamber 84. However, upon supply of fluid under pressure to chamber 73, the device 16 is adapted to assume an application position, in which valve 80 will be held seated by stem 77 which acts through engagement of said valve with the plunger 81 to hold valve 85 unseated against action of spring 88.

It will thus be noted that so long as the actuating pipe 40 is devoid of fluid under pressure, device 16 will remain in normal position for connecting passage 28 to passage 30 and hence to the brake cylinder relay valve device 8; and when pipe 40 is charged with fluid under pressure for effecting an independent release of an automatic or electro-pneumatic brake application on the locomotive, passage 28 will be dead-ended at device 16 and passage 30 will be opened to passage 46 for controlling operation of the brake cylinder relay valve device 8 according to the preselected pressure of fluid in the independent application and release pipe 47.

The electro-pneumatic interlock valve device 18 may be of the same type as the device 16, and hence like reference numerals will be used to identify identical components of the respective devices. With device 18, however, the control chamber 73 is chargeable with fluid under pressure or ventable to atmosphere by way of a passage 89; chamber 74 is chargeable with fluid under pressure or ventable to atmosphere by way of a passage 90; chamber 79 is open to a branch of passage 12; chamber 84 is open to passage 43; and chamber 86 is constantly open to atmosphere by way of a branch of exhaust passage 68.

A preferably ball-type check valve 91 is interposed between passage 89 and a branch of passage 12 for permitting unrestricted release of fluid under pressure from chamber 73 of device 18 via passage 89 to passage 12 but preventing flow in the reverse direction. A choke 92 and a timing volume 93 are arranged in parallel with the check valve 91, however; said choke being provided for permitting flow of fluid under pressure from passage 12 at a restricted rate to passage 89, and said volume being provided for retarding the rate of build-up in pressure in chamber 73 of device 18 with the use of a somewhat larger choke 92 so as to minimize the possibility of clogging of said choke.

According to another feature of the invention, a preferably ball-type check valve 94 is interposed between passage 90 and a branch of passage 27, for permitting flow of fluid under pressure from passage 27 to passage 90 and preventing flow in the reverse direction; passage 27 being open through a choke 95 to the passage 24. A choke 96 is arranged in parallel with the check valve 94, however, for controlling the rate of release of fluid under pressure from chamber 74 of device 18 to passage 27, for reasons to be explained subsequently.

It is to be noted that the spring 87 of device 18 is adapted to be overcome when the pressure in chamber 73 exceeds that in chamber 74 of said device by a very slight differential, such as 5 p. s. i., for assuring that if an electro-pneumatic brake application is effected while the dynamic brakes are cut in on the locomotive, the device 18 will promptly move to application position so as to prevent sliding and possible flattening of the locomotive wheels which may result from an electro-pneumatic brake application on the locomotive being superimposed upon the dynamic brake application.

*Operation*

Let it be assumed that the independent brake valve handle 70 is in normal position, opening both the actuating pipe 40 and independent application and release pipe 47 to atmosphere. With actuating pipe 40 thus vented, chamber 37 in selector valve device 21 will be vented and hence slide valve 41 will be in normal position; and, with pipe 40 vented, the control chamber 73 of independent brake release interlock valve device 16 will also be devoid of fluid under pressure, with the result that the latter device will be in normal position. Assume now that the dynamic brakes on the locomotive are cut out of operation, with the result that magnet valve device 17 is consequently deenergized and valves 66 are therefore in upper position, opening chamber 25 to chamber 29. If it is further assumed that the brake pipe 1 is charged to normal operating pressure and that the straight air pipe 2 is vented to atmosphere, both passage 7 and passage 12 will be vented and hence control chamber 73 of electro-pneumatic brake interlock valve device 18 will be devoid of fluid under pressure and said device will consequently be in normal position. Thus, under the assumed conditions, the various components of the respective devices will be in the positions in which they are shown in the drawing, with the possible exception of the double check valve 19, 20, which is not important.

If the engineer now desires to effect an automatic brake application on the locomotive and cars, he causes a reduction in pressure in the brake pipe 1 for causing the service portion 5 of brake controlling valve device 4 (or both the service and emergency portions 5, 11 in the event of an emergency reduction) to supply fluid under pressure to the passage 7, in the manner previously described. Fluid under pressure thus supplied to passage 7 will flow in the well-known manner to the usual displacement volume 97 and also to the lower end of double check valve 19, shifting same to an upper position for thereby sealing off vented passage 23 and enabling such fluid to flow via passage 24 to chamber 25 of magnet valve device 17, whence it will flow, with valves 66 in upper position, to chamber 29 of the latter device and thence to passage 27. Some of the fluid under pressure thus supplied to passage 27 will unseat ball check valve 94 and flow via passage 90 to chamber 74 of interlock valve device 18, which is of no consequence under this condition; while, at the same time, some of such fluid will also flow to the lower end of double check valve 20, shifting same to an upper position for thereby sealing off vented passage 26 and enabling such fluid to flow to passage 28. Since the actuating pipe 38 is vented to atmosphere and independent brake release interlock valve device 16 is consequently in normal position, fluid under pressure thus supplied to passage 28 will flow via chambers 79 and 84 of said device to passage 30, whence it will flow via pipe 31 to the brake cylinder relay valve device 8 for actuating same to supply fluid at a corresponding pressure from the supply pipe 9 to the brake cylinder device 10 for effecting an automatic service or emergency application of the locomotive brakes, as the case may be, in unison with those on the cars. By reverse flow through the communication just described, fluid under pressure will be released from the brake cylinder relay valve device 8, upon response of the brake controlling valve device 5 to recharging of the brake pipe 1, for thereby releasing the locomotive brakes in unison with those on the cars.

If the engineer desires to effect an electro-pneumatic brake application on the locomotive and cars, he causes fluid under pressure to be supplied, in the manner previously described, to the straight air pipe 2 and hence to the passage 12. Since at the time this brake application is initiated, the electro-pneumatic brake interlock valve device 18 will be in normal position, fluid under pressure thus supplied to passage 12 will flow via chambers 79 and 84 of said device through passage 43 and, with slide valve 41 in normal position, via cavity 42 to passage 23 and thence to the upper end of double check valve 19, shifting same to lower position for sealing off the vented passage 7 and enabling such fluid to flow via passage 24 and the communication previously described, including passages 27, 28 and 30 to the brake cylinder relay valve device 8 to actuate same in the manner heretofore described for applying the locomotive brakes; it being noted that some of such fluid will flow via passage 27, past check valve 94 to the chamber 74 of device 18 for rapidly boosting the pressure in the latter chamber to maintain device 18 in normal position against action of fluid under pressure supplied via another branch of passage 12, choke 92, volume 93 and passage 89 to the chamber 73 of device 18. Thus, the choke 92 and volume 93 cooperate to retard the rate of buildup in pressure in chamber 73 of device 18, while fluid under pressure is supplied to chamber 74 of said device at a substantially unrestricted rate past check valve 94; this arrangement assures that said device will remain in normal position throughout an electro-pneumatic brake application on the locomotive and cars, for thereby preventing an undesirable, unintentional lockout of such application on the locomotive.

If the engineer cuts in the dynamic brakes on the locomotive when either an electro-pneumatic or an automatic brake application is effective throughout the train, such application will be promptly released on the locomotive, in the manner now to be explained. When the dynamic brakes on the locomotive are cut into operation, the resultant energization of magnet 65 of the dynamic brake interlock magnet valve device 17 will cause the valves 66 to move to lower position for thereby venting fluid under pressure from the brake cylinder relay valve device 8 to atmosphere, by way of passage 30, 28, 27 and chambers 29 and 67 of device 17, and thus releasing the fluid pressure brakes on the locomotive. At the same time, fluid under pressure will be released from chamber 74 of electro-pneumatic brake interlock valve device 18 by way of passage 90, choke 96 and the vented passage 27.

If an electro-pneumatic brake application is in effect at the time of such release of fluid under pressure from chamber 74 of device 18, the pressure of fluid in chamber 73 of said device will cause said device to move to application position against the light resistance of spring 87, thereby seating valve 80 for cutting off supply of fluid at straight air pipe pressure from passage 12 to chamber 84 so as to prevent leakage of straight air pipe pressure to atmosphere during the dynamic brake application; and chamber 84 will be vented to atmosphere by way of chamber 86 and exhaust passage 68. Thus, if the electro-pneumatic brake application is still effective on the cars at the time the dynamic brakes are subsequently cut out on the locomotive, the device 18 will remain in application position for desirably preventing an automatic reapplication of the electro-pneumatic brakes on the locomotive. The device 18 will not return to normal position until the electro-pneumatic application is substantially released throughout the train by release of fluid under pressure from the straight air pipe 2 and hence from passage 12, at which time fluid under pressure will be rapidly released from chamber 74 of said device via the unseated check valve 91 and vented passage 12. Therefore, if the engineer desires to reapply the brakes on the locomotive without releasing the brakes on the cars, he may either cut in the dynamic brakes on the locomotive again or else, if preferred, effect an independent application of the locomotive brakes to any desired degree by moving the independent brake valve handle 70 into the application zone, as will be described subsequently.

If, on the other hand, an automatic brake application is in effect at the time the dynamic brakes are cut in on the locomotive, the device 18 will remain in normal position upon release of fluid under pressure from chamber 74 of said device because the straight air pipe 2 and hence chamber 73 of said device will be devoid of fluid under pressure. Fluid under pressure will be released from the displacement volume 97, however, by way of passages 7, 24, choke 95 and the vented passage 27 for desirably preventing an automatic reapplication of the fluid pressure brakes on the locomotive in the event the dynamic brakes are cut out while the automatic application is still effective on the cars. Since the automatic application will thus be held off the locomotive after cutout of the dynamic brakes and until the automatic application is released on the cars, the engineer can either cut in the dynamic brakes again or else effect an independent brake application if he desires to rebrake the locomotive without releasing the automatic application on the cars.

If, however, the dynamic brakes are first cut in on the locomotive and an electro-pneumatic or automatic brake application is thereafter made on the train, as is the more common practice, the brake cylinder relay valve device 8 and chamber 74 of device 18 will remain vented to atmosphere by operation of device 17 and hence such application will be held off on the locomotive, as will be understood from previous description.

The purpose of the ball check valve 94 and the choke 96 will be more readily understood after a brief description of the brake cylinder relay valve device 8. It is common practice, especially on locomotives in high-speed passenger service, to employ a brake cylinder relay valve device which desirably controls the braking ratio according to the speed of the train, so as to give maximum braking ratio at very high speeds and then, as train speed decreases, to reduce such ratio to prevent sliding of the locomotive wheels. In the aforementioned Instruction Pamphlet there is shown and described an "FS-1864 Relay Valve" which is of the speed-controlled type and comprises, briefly, a plurality of coaxially connected flexible diaphragms (not shown) of varying effective areas, which diaphragms separate and in part define a series of diaphragm chambers adapted to be progressively charged with fluid under pressure from the pipe 31 at successively higher speed ranges for exerting a correspondingly higher force on said diaphragms for, in turn, providing fluid at a correspondingly higher pressure in the brake cylinder device 10. It has been found that if while the electro-pneumatic brakes are applied throughout the train, the train speed increases from one range to the next higher speed range, such as while descending a grade, the resultant opening of a hitherto vented diaphragm chamber will temporarily cause a reduction in pressure in said pipe. By restricting the rate of release of fluid under pressure from chamber 74 of device 18, the choke 96 assures that such a reduction in pressure in pipe 31 and hence in passage 27 will not cause undesired movement of device 18 to application position, and said choke thereby prevents an unintentional and undesirable lockout of the electro-pneumatic brake on the locomotive, such as might otherwise have occurred. The choke 96 should not restrict the rate of release of fluid under pressure from chamber 74 of device 18 to a degree greater than that necessary to prevent the unintentional lockout of an electro-pneumatic application on the locomotive, as just described, for it is also important to assure that an electro-pneumatic application will be promptly released on the locomotive, as previously described, when the dynamic brakes are cut into operation.

If at a time when all brakes are released on the train or the dynamic brakes are cut in on the locomotive, the engineer desires to make an independent brake application on the locomotive, he moves the independent brake valve handle 70 from normal position to a position in the application zone corresponding to the degree of braking selected, for thereby providing fluid in the independent application and release pipe 47 at a pressure corresponding to the extent of such movement. Fluid under pressure thus supplied to pipe 47 will flow to passage 46 and, with the slide valve 41 in normal position, via slide valve cavity 45 to passage 26, shifting double check valve 20 to a lower position for sealing off passage 27 and enabling such fluid to flow to passage 28 and thence, with interlock valve device 16 in normal position, via chambers 78 and 84 of the latter device to passage 30 and pipe 31 for actuating the brake cylinder relay valve device 8 to cause an application of the locomotive brakes, in the manner previously described. By reverse flow through the communication just described, fluid under pressure may be released from the relay valve device 8 by movement of independent brake valve handle 70 toward or to normal position, for correspondingly releasing the independent brake application.

If either an automatic or an electro-pneumatic brake application is effective throughout the train, such application may be completely released and thereafter held off on the locomotive by depressing the independent brake valve handle 70 in normal position for a certain period of time and then releasing said handle, as will now be explained. With handle 70 depressed, fluid under pressure will be supplied to the actuating pipe 40 while the independent application and release pipe 47 will remain vented. Some of the fluid under pressure thus supplied to pipe 40 will flow via passage 39 to chamber 73 of interlock valve device 16 for actuating same to application position so as to promptly vent the brake cylinder relay valve device 8 to atmosphere by way of passage 30, chambers 84 and 86 of device 16 and the vented passage 46 and pipe 47, for thus releasing the fluid pressure brakes on the locomotive, and some of the fluid under pressure supplied to pipe 40 will also flow to chamber 37 of selector valve device 21, causing slide valve 41 to move to upper position. With slide valve 41 in this position, fluid under pressure will be released from passages 26 and 23 to atmosphere by way of cavity 48 and vent passage 49; passage 43 will be dead-ended at slide valve cavity 42; passage 50 will be connected to the vented independent application and release pipe 47 by way of slide valve cavity 45 and passage 46; and fluid under pressure will flow from chamber 33 of device 21 through slide valve aperture 64 to passage 54 and chamber 55 of quick release valve device 22 for causing the valve 60 to be unseated and thus release fluid under pressure from passages 28, 27, and 24 and also from chamber 74 of electro-penumatic brake interlock valve device 18 via choke 96 and vented passage 27.

Upon this release of fluid under pressure from chamber 74, if an electro-pneumatic brake application is being independently released, device 18 will move to application position for desirably seating valve 80 and thus cutting off the supply of fluid under pressure from the straight air pipe 2 by way of passage 12; and since such supply will remain cut off so long as the electro-pneumatic brake application is effective on the cars and maintains chamber 73 of device 18 charged from the straight air pipe 2, manual force may be released from the independent brake valve handle 70 as soon as device 18 has moved to application position, and the electro-pneumatic brake application will nevertheless be held off the locomotive, as will be explained presently.

If, however, an automatic brake application is being independently released on the locomotive, the device 18 will remain in normal position, but the displacement volume 97 will be rapidly vented to atmosphere by way of passages 7, 24, 27 and 28 and the unseated release valve 60; hence after a short time, manual force may be released from independent brake valve handle 70 and the automatic brake application will nevertheless be held off the locomotive, as will now be explained.

Upon relaxation of manual force from handle 70 following the independent release on the locomotive of either an electro-pneumatic or automatic brake application, the actuating pipe 40 will be vented to atmosphere causing interlock valve device 16 to return to normal position and slide valve 41 of selector valve device 21 to also return to normal position for causing reseating of the release valve 60 of device 22. Since there is no available source of fluid under pressure to reapply the fluid pressure brakes on the locomotive, said brakes will remain released, as heretofore stated.

If, however, the engineer desires to only partially release an electro-pneumatic or automatic brake application on the locomotive, yet maintain such application fully effective on the cars, he moves the independent brake valve handle 70 from normal position into the application zone to a position corresponding to the degree of partial application he desires to retain and, at the same time, he depresses said handle. Thus fluid is supplied to the independent application and release pipe 47 at a pressure corresponding to the position of handle 70 in the application zone and, concurrently therewith, fluid at main reservoir pressure is supplied to the actuating pipe 40. Under this condition, the device 16 will move to application position, slide valve 41 of device 21 will move to upper position, and quick release valve 60 of device 22 will be unseated, as just explained in connection with complete independent release. However, fluid pressure in the brake cylinder relay valve device 8 will equalize with the preselected pressure maintained in pipe 47 by operation of the self-lapping valve means of independent brake valve device 69, for thereby retaining a corresponding degree of fluid pressure brake application on the locomotive. While the slide valve 41 is in upper position, fluid at main reservoir pressure will flow at a rate controlled by choke 55 from passage 54 to passage 50 and thence via slide valve cavity 45 to passage 46; but this excess pressure will be released via the aforementioned self-lapping valve means of independent brake valve device 69.

After a short interval of time sufficient to cause movement of the device 18 to application position in the case of an electro-pneumatic brake application or to permit venting of the displacement volume 97 in the case of an automatic brake application, the independent brake valve handle 70 may be released; whereupon the slide valve 41 and device 16 will return to their respective normal positions. Under this condition, the supply of fluid under pressure from the pipe 47 to the brake cylinder relay valve device 8 will be maintained via passage 46 and, with slide valve 41 in normal position, via cavity 45, passages 26 and 28, and, with device 18 in normal position, via chambers 79 and 84 of the latter device, passage 30 and pipe 31.

*Summary*

It will now be seen that, with the improved brake apparatus, an electro-pneumatic or automatic brake application may be completely or partially released on the locomotive to any desired extent, and that the independent brake valve handle need not be maintained depressed in order to thereafter hold such application off the locomotive. This apparatus therefore desirably permits the use of an independent brake valve device without the special "lockdown" feature.

It will also be seen that this apparatus embodies means for eliminating the possibility of an unintentional lockout of the electro-pneumatic brakes on the locomotive, when during an electro-pneumatic application throughout the train, train speed increases from one speed range to a next higher speed range, such as while descending a grade, and results in a temporary reduction in pressure in the brake cylinder relay valve control pipe 31.

Having now described the invention, what I claim as new and desire to secure by Letters Patent, is:

1. In a fluid pressure brake apparatus, in combination, brake applying means operable by fluid under pressure to effect an application of brakes and responsive to release of fluid under pressure to effect a release of brakes; a first passage, a second passage, an independent brake valve device comprising valve means adapted to be variously conditioned by operation of a handle for providing fluid at a selectable pressure in said first passage and selectively or concurrently supplying fluid under pressure to said second passage or concurrently releasing fluid under pressure from both said passages, a conduit, means by way of which fluid under pressure is adapted to be conveyed to and released from said conduit, other valve means controlled by pressure of fluid in said second passage for controlling communication through said conveying means and operative under one condition of pressure in said second passage to move to one position to open said communication and operative under another condition of such pressure to move to a second position to close said communication and third valve means responsive to movement of said other valve means to said second position to release fluid under pressure from said conduit and ineffective for so releasing fluid under pressure from said conduit when said other valve means is in its said one position, and independent brake release interlock means controlled by pressure of fluid in said second passage and operative under said one condition and said other condition to respectively open said conduit and said first passage alternatively to said brake applying means.

2. In a fluid pressure brake apparatus, the combination of brake applying means operable by fluid under pressure to effect an application of brakes, a conduit, a plurality of communications chargeable with fluid under pressure, means including double check valve means for conveying fluid under pressure from said communications selectively to said conduit according to which of said communications is charged with fluid at the preponderating pressure, an independent application and release pipe, an actuating pipe, an independent brake valve device comprising valve means adapted to be variously conditioned by operation of a handle to provide fluid at a selectable pressure in said application and release pipe and selectively or concurrently supply fluid under pressure to said actuating pipe or concurrently release fluid under pressure from both such pipes, and independent brake release interlock means controlled by pressure of fluid in said actuating pipe and operative when the latter is devoid of fluid under pressure to open said conduit to said brake applying means and operative when said actuating pipe is charged with fluid under pressure to open said application and release pipe to said brake applying means for causing the brakes to be controlled according to pressure of fluid in the latter pipe.

3. In a fluid pressure brake apparatus, the combination of brake applying means operable by fluid under pressure to effect an application of brakes and responsive to release of fluid under pressure to effect a release of brakes, a conduit, a plurality of fluid pressure communications, means including double check valve means for conveying fluid under pressure from said communications selectively to said conduit according to which of said communications contains fluid at the preponderating pressure, an independent pipe, an actuating pipe, an independent brake valve device comprising valve means adapted to be variously conditioned by operation of a handle to provide fluid at a selectable pressure in said independent pipe and selectively or concurrently supply fluid under pressure to said actuating pipe or concurrently release fluid under pressure from both of said pipes, quick release valve means having one position for releasing fluid under pressure from said conduit and said communications and having another position in which it is inoperative for so releasing fluid under pressure, selector valve means controlled by pressure of fluid in said actuating pipe and responsive to release of fluid under pressure from the latter pipe to open said independent pipe to one of said communications and operative when said actuating pipe is charged to close said independent pipe from said one communication and also cause operation of said quick release valve means to its said one position, and independent brake release interlock means controlled by pressure in said actuating pipe and operative to open said brake applying means selectively to said conduit or to said independent pipe according to whether fluid under pressure is respectively released from or supplied to said actuating pipe, for thereby causing operation of said brake applying means to be controlled according to pressure in said independent pipe during successive supply and release of fluid under pressure respectively to and from said actuating pipe.

4. In a fluid pressure brake apparatus, the combination of brake applying means operable by fluid under pressure to effect an application of brakes and responsive to release of fluid under pressure to effect a release of brakes, a conduit, a plurality of communications adapted to be variously charged with fluid under pressure, first valve means for controlling opening of said communications selectively to said conduit according to which of said communications is charged with fluid at the preponderating pressure, an independent application and release pipe, second valve means operative in one position to release fluid under pressure from said conduit and all of said communications and in another position ineffective for causing such release, third valve means operative under one condition for effecting movement of said second valve means to its said one position and for also closing said pipe to one of said communications and operative under another condition to open said pipe to said one communication and effect movement of said second valve means to its said other position, an operator's fluid pressure control valve device for controlling conditioning of said third valve means and controlling pressure of fluid in said pipe, and independent interlock valve means controlled by operation of said control valve device and operative to open said brake applying means selectively to said pipe or to said conduit according to whether said control valve device is operated to cause said one condition or other condition of said third valve means.

5. In a fluid pressure brake apparatus, the combination of brake applying means operable by fluid under pressure to effect an application of brakes and responsive to release of fluid under pressure to effect a release of brakes, a conduit, means including double check valve means for conveying fluid under pressure to said conduit, an application and release pipe, an actuating pipe, an operator's independent brake valve device comprising valve means adapted to be variously conditioned by operation of a handle so as to control supply of fluid under pressure to and release of fluid under pressure from said pipes selectively or concurrently, independent brake release interlock valve means operative when said actuating pipe is devoid of fluid under pressure to open said conduit to said brake applying means and operative when said actuating pipe is charged with fluid under pressure to close said conduit from said brake applying means and open the latter means to said application and release pipe for controlling the brakes according to pressure in the latter pipe, quick release valve means, and other valve means responsive to supply of fluid under pressure to said actuating pipe to cause operation of said quick release valve means for releasing fluid from said conduit and said conveying means and responsive to subsequent release of fluid under pressure from said actuating pipe to render said quick release valve means non-operative and open said application and release pipe via said conveying means to said conduit for maintaining control of brakes according to pressure in said application and release pipe.

6. In a fluid pressure brake controlling valve device adapted to control automatic, electro-pneumatic and independent applications and release of brakes, in combination, a control conduit chargeable with fluid under pressure for effecting a brake application to a degree corresponding to pressure of such fluid and ventable to atmosphere for causing release of such application, another conduit, a first communication chargeable with fluid under pressure for causing an automatic application, a second communication chargeable with fluid under pressure for causing an electro-pneumatic application, a third communication, first valve means for opening said other conduit to whichever one of said communications is charged with fluid at the preponderating pressure, an independent application and release passage chargeable with fluid at a selectable pressure or ventable to atmosphere, an actuating passage to which fluid under pressure is adapted to be supplied and from which fluid under pressure is adapted to be released, second valve means responsive to pressure of fluid in a chamber for releasing fluid under pressure from said other conduit and all of said communications and responsive to release of fluid under pressure from said chamber for terminating such release of fluid under pressure from said other conduit and communications, third valve means responsive to release of fluid under pressure from said actuating passage to connect said independent application and release passage to said third communication and release fluid under pressure from said chamber and operative upon supply of fluid under pressure to said actuating passage to disconnect said independent application and release passage from said third communication and supply fluid under pressure to said chamber, and independent brake release interlock means controlled by pressure of fluid in said actuating passage and operative to open said control conduit selectively to said other conduit or to a branch of said independent application and release passage according to whether fluid under pressure is respectively released from or supplied to said actuating passage, such that upon successive supply and release of fluid under pressure respectively to and from said actuating passage, pressure in said control conduit will be substantially continuously controlled from said independent application and release passage first by way of said branch and then by way of said third communication and said other conduit.

7. The combination according to claim 6, including dynamic brake interlock valve means operative upon cut-in of dynamic brakes for releasing fluid under pressure from said first and second communications and rendered ineffective for causing such release while dynamic brakes are cut out.

8. In a fluid pressure brake apparatus adapted to control the brakes according to pressure in a straight air pipe, in combination, brake applying means operable by fluid under pressure to effect an application of brakes, means for conveying fluid under pressure to and from said brake applying means, a straight air pipe passage, electro-pneumatic brake interlock valve means controlling communication between said straight air pipe passage and conveying means and comprising movable abutment means subject opposingly to fluid pressures in a first chamber and a second chamber and operative upon a substantial equalization of such opposing pressures to open the communication and upon release of fluid under pressure from said second chamber with said first chamber charged to close the communication and vent fluid under pressure from said conveying means, means comprising choke and check valve means arranged in parallel for restricting rate of supply of fluid under pressure from a branch of said straight air pipe passage to said first chamber but permitting release of fluid under pressure from said first chamber at a substantially unrestricted rate, and other choke and check valve means arranged in parallel and interposed between said second chamber and a branch of said conveying means for restricting rate of release of fluid under pressure from said second chamber and permitting substantially unrestricted supply of fluid under pressure to said second chamber.

9. In a fluid pressure brake apparatus, in combination, brake applying means operable by fluid under pressure to effect an application of brakes and responsive to release of fluid under pressure to effect a release of such application, a first passage, a second passage, an independent brake valve device comprising valve means adapted to be variously conditioned by operation of a handle for providing fluid at a selectable pressure in said first passage and selectively or concurrently supplying fluid under pressure to said second passage or concurrently releasing fluid under pressure from both said passages, a conduit, means by way of which fluid under pressure is adapted to be conveyed to and released from said conduit, independent application and release means comprising first valve means controlled by pressure of fluid in said second passage for controlling communication through said conveying means and operative under one condition of pressure in said second passage to open the communication and operative under another condition to close the communication and also comprising second valve means operable by said first valve means only under said other condition to release fluid under pressure from said conduit, and an independent brake interlock valve device comprising movable abutment means subject to pressure of fluid in said second passage and to an opposing pressure and operative upon supply of fluid under pressure to said second passage to close said conduit to said brake applying means and open the latter means to said first passage and operative upon release of fluid under pressure from said second passage to close said first passage to said brake applying means and open the latter means to said conduit.

10. In a fluid pressure brake apparatus, the combination of brake applying means operable by fluid under pressure to effect an application of brakes and responsive to release of fluid under pressure to effect a release of brakes, a conduit, a plurality of fluid pressure communications, means including double check valve means for conveying fluid under pressure from said communications selectively to said conduit according to which of said communications contains fluid at the preponderating pressure, a straight air pipe passage, another passage, electro-pneumatic brake interlock valve means comprising movable abutment means subject opposingly to fluid pressures in a first chamber and in a second chamber and operative upon substantial equalization of said opposing pressures to open said straight air pipe passage to said other passage and responsive to release of fluid under pressure from said second chamber with said first chamber charged to close said straight air pipe passage to said other passage, first choke and check valve means interposed between said first chamber and a branch of said straight air pipe passage and so arranged as to restrict the rate of supply of fluid under pressure via said branch to said first chamber but permit release of fluid under pressure from said first chamber at a substantially unrestricted rate, second choke and check valve means interposed between said second chamber and a branch of one of said communications and so arranged as to restrict the rate of release of fluid under pressure from said second chamber to said one communication and permit substantially unrestricted supply of fluid under pressure via said one communication to said second chamber, an independent application and release passage, operator-controlled valve means for controlling at a selectable value the pressure of fluid in said independent application and release passage, first valve means operable by fluid under pressure and having a normal position for opening said other passage to said one communication and also opening said independent application and release passage to another of said communications and having a second position for closing off said other passage from said one communication and also closing off said independent application and release passage from said other communication, second valve means responsive to movement of said first valve means to said second position for releasing fluid under pressure from said conduit and all of said communications, an operator's control valve device for controlling positioning of said first valve means, and independent brake release interlock valve means controlled by operation of said control valve device and operative to open said brake applying means alternatively to said conduit or else to said independent application and release passage in by-pass of said first valve means according to whether said control valve device is operated for moving said first valve means to its said normal position or second position, respectively.

11. In a fluid pressure brake apparatus, in combination, brake applying means operable by fluid under pressure to effect an application of brakes and operable upon release of fluid under pressure to effect a release of brakes, a straight air pipe, a first communication for conveying fluid under pressure, electro-pneumatic brake interlock valve means having a control chamber open to said straight air pipe and also having another chamber and operative upon a substantial equalization of pressures in these chambers to open said first communication to said straight air pipe and operative upon release of fluid under pressure from said other chamber with said control chamber charged to close said straight air pipe to said first communication and release fluid under pressure from said first communication, a second communication for conveying fluid under pressure and normally opening said first communication to said brake applying means, release means for releasing fluid under pressure from said brake applying means, selector means operative under one condition for effecting such operation of said release means and closing said first communication to said second communication, operator's control means for controlling conditioning of said selector means, a check valve, and choke means, said check valve and choke means being arranged in parallel with each other and interposed between said other chamber and said second communication for permitting flow of fluid under pressure from said second communication past said check valve to said other chamber at a substantially unrestricted rate and permitting fluid flow at a restricted rate from said other chamber via said choke means to said second communication.

12. The combination according to claim 11, including an independent application and release passage chargeable with fluid at a selectable pressure, independent brake release interlock means operative to open said brake applying means to said independent application and release passage whenever said control means is operated for effecting said one condition of said selector means.

References Cited in the file of this patent
UNITED STATES PATENTS

| | | |
|---|---|---|
| 2,445,680 | Linhart | July 20, 1948 |
| 2,464,977 | Gorman | Mar. 22, 1949 |